(12) United States Patent
Polesel Maris et al.

(10) Patent No.: US 10,271,683 B2
(45) Date of Patent: Apr. 30, 2019

(54) CULINARY ITEM COMPRISING A FLUOROCARBON RESIN AND RARE EARTH OXIDE COATING AND METHOD FOR MANUFACTURING SAID ITEM

(71) Applicant: SEB S.A., Ecully (FR)

(72) Inventors: Jérôme Polesel Maris, Mexy (FR); Laurent Caillier, Pringy (FR); Aurélien Dubanchet, Gresy sur Aix (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/745,772

(22) PCT Filed: Jul. 19, 2016

(86) PCT No.: PCT/FR2016/051858
§ 371 (c)(1),
(2) Date: Jan. 18, 2018

(87) PCT Pub. No.: WO2017/013352
PCT Pub. Date: Jan. 26, 2017

(65) Prior Publication Data
US 2019/0000264 A1    Jan. 3, 2019

(30) Foreign Application Priority Data
Jul. 20, 2015 (FR) .................... 15 56846

(51) Int. Cl.
| | | |
|---|---|---|
| *A47J 36/02* | (2006.01) | |
| *B05D 5/08* | (2006.01) | |
| *B05D 3/02* | (2006.01) | |
| *C09D 7/40* | (2018.01) | |
| *B05D 7/16* | (2006.01) | |
| *C09D 179/08* | (2006.01) | |
| *C09D 5/00* | (2006.01) | |
| *B05D 7/00* | (2006.01) | |

(52) U.S. Cl.
CPC .......... *A47J 36/025* (2013.01); *B05D 3/0254* (2013.01); *B05D 5/083* (2013.01); *B05D 7/16* (2013.01); *B05D 7/542* (2013.01); *C09D 5/00* (2013.01); *C09D 7/69* (2018.01); *C09D 179/08* (2013.01)

(58) Field of Classification Search
CPC ..... A47J 36/025; B05D 5/083; B05D 3/0254; B05D 7/16; B05D 7/542; C09D 7/69; C09D 179/08; C09D 5/00
See application file for complete search history.

(56) References Cited

U.S. PATENT DOCUMENTS

| | | |
|---|---|---|
| 4,180,609 A | 12/1979 | Vassiliou |
| 2011/0287251 A1 | 11/2011 | Leech et al. |

OTHER PUBLICATIONS

Zhao-Zhu, Zhang et al., "Effect of Rare Earth Compounds as Fillers on Friction and Wear Behaviors of PTFE-Based Composites", Journal of Applied Polymer Science, 1999, pp. 361-369, vol. 72, No. 3, US.

*Primary Examiner* — Michael C Miggins
(74) *Attorney, Agent, or Firm* — The Webb Law Firm

(57) ABSTRACT

Provided is a cooking item, at least one of the surfaces of which has a fluorocarbon coating including rare earth oxide fillers. The use of a composition including a fluorocarbon resin and rare earth oxide fillers makes it possible to obtain coatings, the mechanical properties of which (particularly in terms of hardness and resistance to abrasion) are reinforced without any breakdown in the non-stick properties of said composition. Also provided is a method for manufacturing such a cooking item.

15 Claims, No Drawings

CULINARY ITEM COMPRISING A FLUOROCARBON RESIN AND RARE EARTH OXIDE COATING AND METHOD FOR MANUFACTURING SAID ITEM

CROSS-REFERENCE TO RELATED APPLICATIONS

This application is the United States national phase of International Application No. PCT/FR2016/051858 filed Jul. 19, 2016, and claims priority to French Patent Application No. 1556846 filed Jul. 20, 2015, the disclosures of which are hereby incorporated in their entirety by reference.

FIELD OF THE INVENTION

The present invention generally pertains to a culinary item, of which one or more surfaces is equipped with a fluorocarbon coating comprising rare earth oxide fillers. The present invention also pertains to a method for manufacturing such a culinary item.

BACKGROUND ART

The reinforcement of non-stick culinary item surfaces is a constant concern as it serves as a measure of durability.

Conventionally, sintered fluorocarbon resin-based coatings (for example PTFE) are applied to one or more surfaces of a culinary item as a means of forming a non-stick coating. Such coatings are known not only for their non-stick properties but also for their resistance to chemical and thermal damage.

Generally, culinary items, presenting a non-stick coating on their inner surface, have the advantage of being easily cleaned and make it possible to cook foods with little or no grease.

However, such items have a major disadvantage in that the non-stick coating is fragile.

The term fragile coating, in the context of the present invention, signifies a coating that is prone to scratching upon mechanical abrasion such as those caused by overly vigorous scouring pad scrubbing.

To address this major drawback and obtain a non-stick coating with improved mechanical properties, it is known to persons of ordinary skill in the art to produce a multi-layer non-stick coating, the first layer of which, from the support surface of the culinary item, (also known as the primer layer) serves as a surface onto which one or more additional layers of the non-stick coating (also known as finishing layers) contains, in addition to the sintered fluorocarbon resin, a high content of hard mineral or organic fillers (for example, silica, quartz or aluminum).

The addition of this type of fillers in coatings comprising at least one fluorocarbon resin makes it possible to improve resistance against abrasion, scratching and flaking (interlayer delamination).

However, this type of reinforcement is limited by the fact that the filler content in each coating layer cannot exceed more than a few percent by weight relative to the total weight of the layer. Beyond a certain threshold quantity of fillers, typically in excess of 15% by weight of fillers in the layer, the layer may not be able to adhere, particularly in the case of primer layers, or may lose its non-stick properties, particularly in the case of finishing layers.

Furthermore, it is known to persons of ordinary skill in the art to form a hard undercoat (also called a hard base) between the support (in this case the surface of a culinary item) and the non-stick coating (particularly the primer layer).

The establishment of a hard undercoat (or hard base) between the support and the non-stick coating makes it possible not only to improve the mechanical properties of the non-stick coating (particularly with respect to hardness), but also to ensure that the coating has a high scratch resistance.

The hard undercoat (or hard base) thus forms a barrier that prevents scratches from reaching the support.

SUMMARY OF THE INVENTION

To eliminate the need to apply such a hard undercoat, the applicant has found that the application of a composition comprising a fluorocarbon resin and one or more rare earth oxides, directly onto the support, or possibly on a primer layer, makes it possible to improve the mechanical properties of the coating (particularly with respect to hardness and abrasion resistance) without diminishing its non-stick properties.

Unlike the fillers ($SiO_2$, $Al_2O_3$, $TiO_2$) commonly used to reinforce coatings, rare earth oxide fillers have the advantage of being both hard and hydrophobic, thereby improving the scratch and abrasion resistance of the fluororesin coating without diminishing its non-stick properties.

Furthermore, the present invention pertains to a culinary item having improved mechanical properties, comprising a support having an inner surface capable of receiving food and an outer surface intended to interface with a heat source, and a coating applied to at least one of the two surfaces, characterized in that the coating comprises at least one layer comprising:
  a matrix of fluorocarbon resin, alone or in a mixture with a binding resin that is thermostable and resistant to temperatures greater than 200° C., this resin or resins forming a continuous sintered network; and
  rare earth oxide layers dispersed in said matrix, 50% of which having a largest characteristic dimension greater than or equal to from 0.1 µm.

The presence of rare earth oxide fillers in the fluorocarbon resin matrix makes it possible, in particular, to obtain coatings with improved mechanical properties compared to coatings without said fillers.

Although the rare earth oxide fillers are microscale, the coating of the culinary item according to the invention has improved mechanical properties compared to coatings having nanoscale rare earth oxide fillers.

Advantageously, the fluorocarbon resin may be selected from the group comprising polytetrafluoroethylene (PTFE), modified PTFE, tetrafluoroethylene and perfluoropropyl vinyl ether (PFA) copolymers, and tetrafluoroethylene and hexafluoropropylene (FEP) copolymers.

Preferably, the fluorocarbon resin may be polytetrafluoroethylene (PTFE), or a mixture of PTFE and PFA (PTFE/PFA), or a mixture of PTFE and FEP (PTFE/FEP) or a mixture of PTFE, PFA and FEP (PTFE/PFA/FEP).

In the context of the present invention, fluorocarbon resin may be used in a mixture with a binder resin, which may be selected from the polyamide-imides (PAI), polyetherimides (PEI), polyamides (PI), polyetherketones (PEK), polyetheretherketones (PEEK), polyethersulfones (PES), polyphenylene sulfides (PPS) and mixtures thereof.

These binding resins have the advantage of being thermostable and resistant to temperatures greater than 200° C.

Preferably, the coating covering at least one of the two support surfaces may comprise a primer layer and at least one finishing layer, at least one of said finishing layers defining a surface layer, the primer layer and the one or more finishing layers each comprising at least one sintered fluorocarbon resin, alone or in a mixture with a binder resin, forming a continuous sintered network of fluorocarbon resin and, where applicable, binder resin.

Advantageously, the coating covering at least one of the two support surfaces may comprise fillers to facilitate thermal conduction inside the non-stick coating, for example organic or mineral fillers and/or pigments.

It should be noted that it is generally less desirable to introduce these fillers in the top finishing layer as this arrangement can diminish the non-stick properties of the coating.

On the other hand, the introduction of rare earth oxide fillers into at least one of the finishing layers does not alter the non-stick properties of the layer as the rare earth oxide fillers have the advantage of being hydrophobic. Consequently, the rare earth oxide fillers are preferably introduced into at least one of the finishing layers.

Advantageously, the rare earth oxide fillers may be lanthanide oxide fillers.

Preferably, the rare earth oxide fillers may comprise cerium oxide, alone or in a mixture with at least one other lanthanide oxide.

Advantageously, the largest characteristic dimension of 50% of the rare earth oxide fillers ranges from 0.1 µm and 50 µm.

According to one embodiment, the largest characteristic dimension of 50% of the rare earth oxide fillers ranges from 1 µm and 50 µm, and preferably from 5 µm and 25 µm.

Advantageously, fillers of such sizes are used when said fillers are introduced into a layer that is not intended to be translucent.

The introduction of rare earth oxide fillers characterized by such particle size makes it possible to produce opaque coatings characterized by high mechanical resistance.

According to another embodiment, the largest characteristic dimension of 50% of the rare earth oxide fillers ranges from 0.1 µm and 1 µm, and preferably from 0.1 µm to 0.3 µm. Advantageously, fillers of such sizes are used when said fillers are introduced into a layer that should remain translucent to reveal a color or design element on a lower layer.

The introduction of rare earth oxide fillers characterized by such particle size makes it possible to produce a transparent film with good mechanical properties while remaining translucent such that incident light may pass through the layer (partially or completely).

Advantageously, the rare earth oxide fillers are present at a concentration ranging between 0.1 and 20% by weight relative to the total dry weight of the layer.

For example, to produce an opaque layer, rare earth oxide fillers will be introduced, preferably, such that the largest characteristic dimension of 50% of said fillers ranges between 0.1 µm and 50 µm (preferably between 5 µm and 25 µm) and such that their concentration ranges from 1 to 10 percent by weight relative to the total dry weight of the layer.

However, to produce a transparent layer, rare earth oxide fillers will be introduced, preferably such that the largest characteristic dimension of 50% of said fillers ranges between 0.1 µm and 1 µm (preferably between 0.1 µm and 0.3 µm) and such that their concentration ranges from 0.1 to 3% by weight relative to the total dry weight of the layer.

In the context of the present invention, the dry thickness of the layer comprising one or more rare earth oxide fillers ranges between 1 µm and 25 µm. These thicknesses apply both to the opaque layers and the transparent layers.

It should be noted that, preferably, the rare earth oxide fillers in the fluorocarbon resin matrix do not protrude, to avoid scratches on surfaces (such as heating plates) that may come into contact with the coating according to the invention.

It should be noted that, advantageously, the support may be made of a metal, glass, ceramic or terracotta material.

Preferably, for the article according to the invention, the support used would be metal, and may advantageously be made of aluminum, anodized or not, and possibly polished, brushed, sanded or bead-blasted, or of steel, which may be polished, brushed, sanded or bead-blasted, or of stainless steel that may be polished, brushed, sanded or bead-blasted, or of cast steel, cast aluminum or cast iron, or of copper that may be hammered or polished.

Preferably, the metal support of the item according to the invention may comprise alternate layers of metal and/or metal alloy, or a cap of cast aluminum, aluminum or aluminum alloy reinforced with a stainless steel exterior base.

For example, as a support comprising alternate layers of metal and/or metal alloys (or comprised of a multilayered composite structure), one may use a support comprising stacked layers of ferritic stainless steel, aluminum and austenitic stainless steel. One may also choose to use a support comprising stacked layers of stainless steel, aluminum, copper and another layer of aluminum and a layer of austenitic stainless steel.

Finally, the present invention also pertains to a method of manufacturing a culinary item according to the invention.

Specifically, the present invention pertains to a method of manufacturing a culinary item comprising the following steps:

a.) provision of a support;

b.) preparation of an aqueous dispersion of fluorocarbon resin, possibly mixed with a binder resin;

c.) dispersion of rare earth oxide fillers in the fluorocarbon resin dispersion;

d.) application of the dispersion obtained in step c) onto at least one surface of the support; and e.) baking of the entirety.

In the context of the method according to the invention, a preform, having the shape of a flat surface, may be used as a support. In this case, the method according to the invention will additionally comprise a step to form the support preform into the desired item shape, said forming step being performed prior to step e) baking.

Other types of items may also be considered in accordance with the invention. For example, in the culinary field, consideration could be given to flat disks intended to be stamped into the final form of a cookware item or items, whether intended to cook foods or not, The term flat disk, in the context of the present invention, signifies a flat, round metal piece commercially cut from a sheet or strip of metal.

In this case, final culinary items typically have the form of a dome.

Consideration may also be given to the use of other types of flat supports, as appropriate for the culinary item that one desires to produce (particularly elliptical, rectangular or square shapes).

It should be noted that the production methods for culinary items remain unchanged by the new coating composition according to the invention. Thus, in an entirely conventional manner, rare earth oxide fillers may be introduced in their dry (powder form) state, as an aqueous dispersion or solvent dispersion (comprising one or more solvents), in aqueous dispersions comprising at least one fluorocarbon resin.

In the context of the present invention, the term solvent signifies organic or organic-inorganic compounds that do not generate carbon residues.

It should be noted that the advantage of using a solvent compared to water is that it is more volatile. A significant fraction of the of carbon compounds is thus eliminated quickly by drying immediately after application.

Advantageously, the solvent has a boiling point that ranges between 30° C. and 200° C.

When the boiling point is too low, in other words below 30° C., the dispersion is difficult to manipulate because it is susceptible to premature drying, particularly on layers, which can damage the quality and effectiveness of the deposit.

When the boiling point is too high, in other words greater than 200° C., the preliminary drying requirements are increased, which requires more energy.

The solvent has a boiling point ranging from 30° C. to 200° C. and preferably from 50° C. to 140° C.

A boiling point between 50° C. and 140° C. corresponds to solvents for which drying time is optimal, premature drying does not occur during the application and for which no extraordinary drying means are required. This range of temperatures (50° C. to 140° C.) also corresponds to solvents having acceptable safety properties.

Among the types of solvents that could be used in the context of the present invention, notable mention may be made of cyclic or alicyclic aliphatic alkanes, aromatic solvents, ethers, esters, alcohols and ketones.

It should be noted that the viscosity of the dispersions according to the invention is modifiable and may be adapted to suit the selected application technique. It is entirely possible to produce a coating according to the invention using localized spot treatments to develop a homogenous layer comprising a fluorocarbon resin and one or more rare earth oxide fillers.

To apply the compositions according to the invention, a number of application techniques may be employed, including, in particular, screen printing, pad printing, spraying, flexographic printing, induction and ink jet printing.

A coating layer according to the invention, having enhanced mechanical properties, may be obtained in a single step, by the application of one or more homogenous layers comprising a fluorocarbon resin and one or more rare earth oxide fillers directly onto a support, the rare earth oxide fillers being uniformly dispersed throughout the thickness of the layer.

However, conventionally, coatings for culinary items comprise multiple layers, and in particular comprise at least one primer layer and at least one finish layer, the primer layer and finish layer being of a fluorocarbon resin based composition that may also include a thermostable binder resin that is resistant to temperatures in excess of 200° C., the outermost finish layer comprising at least one fluorocarbon resin and one or more rare earth oxide fillers.

As non-limiting examples of culinary items in accordance with the present invention, notable mention may be made of culinary items such as pots and pans, woks and frying pans, crepe pans, grills, baking forms and sheets and barbecue grates and grills.

Other advantages and particularities of the present invention will become clear upon review of the following description, provided as a non-limiting example.

DETAILED DESCRIPTION OF THE INVENTION

In these examples, except as otherwise noted, all percentages and portions are expressed as percent by weight.

EXAMPLES

Products
aluminum support;
aqueous dispersion of 60% PTFE;
octyl phenol ethoxylate;
aqueous dispersion of 25% carbon black;
colloidal silica as an aqueous solution containing 30% silica sold by Clariant under the commercial name Klebosol;
polyamide imide in aqueous solution;
acrylic polymer emulsion with 5% of alumina fillers;
water;
treated mica flakes;
alumina F400 (D50=17.3 microns)
Tests
Scratch Test The scratch resistance of the coating is evaluated by subjecting the finish layer to the action of a green SCOTCH BRITE (trademark) style abrasive pad. The scratch-resistance of the coating is evaluated qualitatively, after multiple passes of the abrasive pad under a weight of 21 N. The action of the abrasive pad is then interrupted when the operator detects scratching (corresponding to the appearance of the support metal or of a sub-layer underneath the finish layer), or after completing 36,000 cycles (one cycle corresponding to one back and forth movement). Every 1000 cycles, the used abrasive pad is replaced by a new abrasive pad.

Test for Loss of Non-Stick Properties

The non-stick properties of the finish coating are evaluated using the carbonized milk test according to standard NF D 21-511. The operator checks for the appearance of scratching and performs a burned milk adhesion test every time the abrasive pad is replaced (see results in Table 6).

EXAMPLES PRODUCED (EXPERIMENTAL CONDITIONS AND COMPOSITIONS)

As regards Example 1 and Comparative Examples 1 and 2, a PTFE-based primer composition was prepared, the composition of which is described in Table 1 below.

This composition forms, after being sprayed onto an aluminum support having previously been subject to surface treatment and blasting, a primer layer for a coating according to the invention, comprising rare earth oxides (for Example 1), or a conventional coating with alumina fillers, or having no fillers (Comparative Examples 1 and 2, respectively).

After the primer layer is applied, it is dried at 70° C. for 4 minutes.

TABLE 1

| Components of the primer composition | Quantities by weight (% wet weight) |
|---|---|
| Aqueous dispersion of 60% PTFE | 22.0 |
| Octyl phenol ethoxylate; | 0.3 |
| Aqueous dispersion of 25% carbon black; | 3.6 |
| 30% colloidal silica | 14.5 |

TABLE 1-continued

| Components of the primer composition | Quantities by weight (% wet weight) |
|---|---|
| Polyamide imide in aqueous solution | 38.4 |
| 5% acrylic polymer emulsion | 4.2 |
| Alumina fillers | 1.5 |
| Water | 15.5 |
| TOTAL | 100.0 |

Example 1 According to the Invention

A finish composition with cerium oxide fillers is prepared, the composition of which is indicated in Table 2 below.

After the application of the primer layer onto the aluminum support (according to the conditions indicated above) and the cooling of the resulting primer layer, the finish composition with rare earth oxide fillers is applied, by spraying, onto the primer layer.

Then, a step to dry the obtained finish layer with rare earth oxide fillers is performed at 70° C. for 1 minute and the entirety is then baked at 415° C. for 11 minutes.

The thickness of the baked films is 10 microns for the primer layer and 18 microns for the finish layer with rare earth oxide fillers.

TABLE 2

| Components of the finish composition including rare earth oxide fillers | Quantities by weight (% wet weight) (preferred example) |
|---|---|
| Aqueous dispersion of 60% PTFE | 84.0 |
| Treated mica flakes | 0.2 |
| 5% acrylic polymer emulsion | 10.0 |
| Cerium oxide D50 = 17.6 microns) | 2.8 |
| Water | 3.0 |
| TOTAL | 100.0 |

Comparative Example 1

A finish composition with alumina fillers is prepared, the composition of which is indicated in Table 3 below.

After the application of the primer composition to the aluminum support (according to the conditions indicated above) and the cooling of the resulting primer layer, the finish composition with alumina fillers is applied, by spraying, onto the primer layer.

Then a step to dry the finish layer with alumina fillers is performed at 70° C. for 1 minute and the entirety is then baked at 415° C. for 11 minutes.

The thickness of the baked films is 10 microns for the primer layer and 18 microns for the finish layer with alumina fillers.

TABLE 3

| Components of the finish composition including alumina fillers | Quantities by weight (% wet weight) (preferred example) |
|---|---|
| Aqueous dispersion of 60% PTFE | 84.0 |
| Treated mica flakes | 0.2 |
| 5% acrylic polymer emulsion | 10.0 |

TABLE 3-continued

| Components of the finish composition including alumina fillers | Quantities by weight (% wet weight) (preferred example) |
|---|---|
| Alumina F400 (D50 = 17.3 microns) | 2.8 |
| Water | 3.0 |
| TOTAL | 100.0 |

Comparative Example 2

As regards comparative example 2, a finish composition without fillers was prepared, the composition of which is described in Table 4 below.

After the application of the primer layer to the aluminum support, according to the conditions indicated above) and the cooling of the resulting primer layer, the finish composition without fillers is applied, by spraying, onto the primer layer.

Then a step to dry the finish layer without fillers is performed at 70° C. for 1 minute, and the entirety is then baked at 415° C. for 11 minutes.

The thickness of the baked films is then 10 microns for the primer layer and 18 microns for the finish layer without fillers.

TABLE 4

| Components of the finish composition without fillers | Quantities by weight (% wet weight) (preferred example) |
|---|---|
| Aqueous dispersion of 60% PTFE | 86.8 |
| Treated mica flakes | 0.2 |
| 5% acrylic polymer emulsion | 10.0 |
| Water | 3.0 |
| TOTAL | 100.0 |

Results of Tests Conducted

Scratch Test and Test for Loss of Non-Stick Properties for the Obtained Coatings The ability of coatings to withstand abrasion and loss of non-stick properties is assessed in Example 1 and in Comparative Examples 1 and 2 in accordance with the tests described above. The results obtained are presented in Table 5 below:

TABLE 5

| Examples | Appearance of scratching after 36000 cycles | Non-stick properties after 36000 cycles |
|---|---|---|
| Example 1 | No | Excellent |
| Comparative Example 1 | No | Adherence of milk |
| Comparative Example 2 | Yes at 26000 cycles | Excellent |

This Table 5 demonstrates that the inclusion of cerium oxide fillers in the finish layer enhances the mechanical properties of the coating without diminishing its non-stick properties.

The invention claimed is:

1. A culinary item comprising a support having an inner surface capable of receiving foods and an outer surface intended to face a heat source, and a coating applied to at least one of the two surfaces, said culinary item being characterized in that the coating comprises at least one layer comprising:

a matrix of fluorocarbon resin, alone or in a mixture with a binding resin that is thermostable and resistant to temperatures greater than 200° C., this resin or resins forming a continuous sintered network, and rare earth oxide layers dispersed in said matrix, 50% of which having a largest characteristic dimension greater than or equal to 0.1 µm.

2. The culinary item according to claim 1, in which the binder resin is selected from the polyamide-imides (PAI), polyetherimides (PEI), polyamides (PI), polyetherketones (PEK), polyetheretherketones (PEEK), polyethersulfones (PES), polyphenylene sulfides (PPS) and mixtures thereof.

3. The culinary item according to claim 1, wherein the rare earth oxide fillers are present at a concentration ranging from 0.1 to 20% by weight relative to the total dry weight of the layer.

4. The culinary item according to claim 1, wherein the dry thickness of said layer ranges from 1 µm to 25 µm.

5. The culinary item according to claim 1, wherein the fluorocarbon resin is selected from the group comprising polytetrafluoroethylene (PTFE), modified PTFE, tetrafluoroethylene and perfluoropropyl vinyl ether (PFA) copolymers, and tetrafluoroethylene and hexafluoropropylene (FEP) copolymers.

6. The culinary item according to claim 5, wherein the fluorocarbon resin is polytetrafluoroethylene (PTFE), or a mixture of PTFE and PFA (PTFE/PFA) or a mixture of PTFE and FEP (PTFE/FEP) or a mixture of PTFE, PFA and FEP (PTFE/PFA/FEP).

7. The culinary item according to claim 1, wherein the rare earth oxide fillers are lanthanide oxide fillers.

8. The culinary item according to claim 7, wherein the rare earth oxide fillers comprise cerium oxide, alone or in a mixture with at least one other lanthanide oxide.

9. The culinary item according to claim 1, wherein the largest characteristic dimension of 50% of the rare earth oxide fillers ranges from 0.1 µm to 50 µm.

10. The culinary item according to claim 9, wherein the largest characteristic dimension of 50% of the rare earth oxide fillers ranges from 1 µm to 50 µm, and preferably from 5 µm to 25 µm.

11. The culinary item according to claim 9, wherein the largest characteristic dimension of 50% of the rare earth oxide fillers ranges from 0.1 µm to 1 µm, and preferably from 0.1 µm to 0.3 µm.

12. The culinary item according to claim 1, wherein the support is made of a metal, glass, ceramic or terracotta material.

13. The culinary item according to claim 12, wherein the support is metal and is made of aluminum, anodized or not, and that may be polished, brushed, sanded, or bead-blasted, or of steel that may be polished, brushed, sanded or bead-blasted, or of stainless steel that may be polished, brushed, sanded, or bead-blasted or of cast steel, cast aluminum, or cast iron, or of copper, that may be hammered or polished.

14. The culinary item according to claim 13, wherein the support is made of metal and comprises alternate layers of metal and/or metal alloy, or a cap of cast aluminum, aluminum or aluminum alloy reinforced with a stainless steel exterior base.

15. A method of preparing the culinary item described according to claim 1, said method comprising the following steps:

a.) providing a support;

b.) preparing an aqueous dispersion of fluorocarbon resin, optionally mixed with a binder resin;

c.) dispersing rare earth oxide fillers in the fluorocarbon resin dispersion;

d.) applying the dispersion obtained in step c) onto at least one surface of the support; and e.) baking of the applied dispersion.

* * * * *